United States Patent [19]

Boyer et al.

[11] Patent Number: 5,233,601
[45] Date of Patent: Aug. 3, 1993

[54] METHOD FOR MEASURING THE LOAD OF A MULTIPLEX AND CIRCUIT FOR ITS IMPLEMENTATION

[76] Inventors: Pierre Boyer, 3 Park an Denved Kerligonan; Michel Servel, Le Rhu en Servel, both of F-22300 Lannion; Didier Tranchier, Crec'h Lagadurier, Pleumeur-Bodou, F-22560 Trebeurden, all of France

[21] Appl. No.: 703,475

[22] Filed: May 17, 1991

[30] Foreign Application Priority Data

May 29, 1990 [FR] France ................... 90 06828

[51] Int. Cl.$^5$ ............................. H04J 3/14
[52] U.S. Cl. ................................. 370/17; 370/60; 370/94.1
[58] Field of Search ............. 370/17, 94.1, 60

[56] References Cited

U.S. PATENT DOCUMENTS

| | | | |
|---|---|---|---|
| 4,603,416 | 7/1986 | Servel et al. | 370/60 |
| 4,896,316 | 1/1990 | Lespagnol et al. | 370/94.1 X |
| 4,993,024 | 2/1991 | Quinqurs et al. | 370/94.1 |
| 5,014,260 | 5/1991 | Wicklund | 370/94.1 X |
| 5,081,620 | 1/1992 | Girard et al. | 370/60 |

FOREIGN PATENT DOCUMENTS 0310173 4/1989 Fed. Rep. of Germany.
0293314 11/1988 France.
WO90/00331 1/1990 PCT Int'l Appl..

OTHER PUBLICATIONS

5th ITC Seminar, Lake Como, May 1987, Chapter 5—Congestion Control; Turner J. S. "The Challenge of Multipoint Communication".

Primary Examiner—Douglas W. Olms
Assistant Examiner—Russell Blum
Attorney, Agent, or Firm—Laff, Whitesel, Conte & Saret

[57] ABSTRACT

The invention provides a method of measuring the load of a communication system, and more particularly of a multiplex switching network for asynchronous cells or packets. Each cell transmitted on the multiplex has a registered value which is divided by a predetermined number (N). The value forms the first operand (E2) of a subtraction and the result of the division forms the second operand (E1). A predetermined value is added to the result of the subtraction when the heading of the transmitted cell contains a particular identifier. A zero value is added in the contrary case. The result of the subtraction followed by the addition constitutes the new value which is to be recorded, which likewise represents the measurement of the load. The identifier identifies, for example, an occupied cell or a cell belonging to a given virtual circuit. A circuit for implementing the method is likewise described.

8 Claims, 1 Drawing Sheet

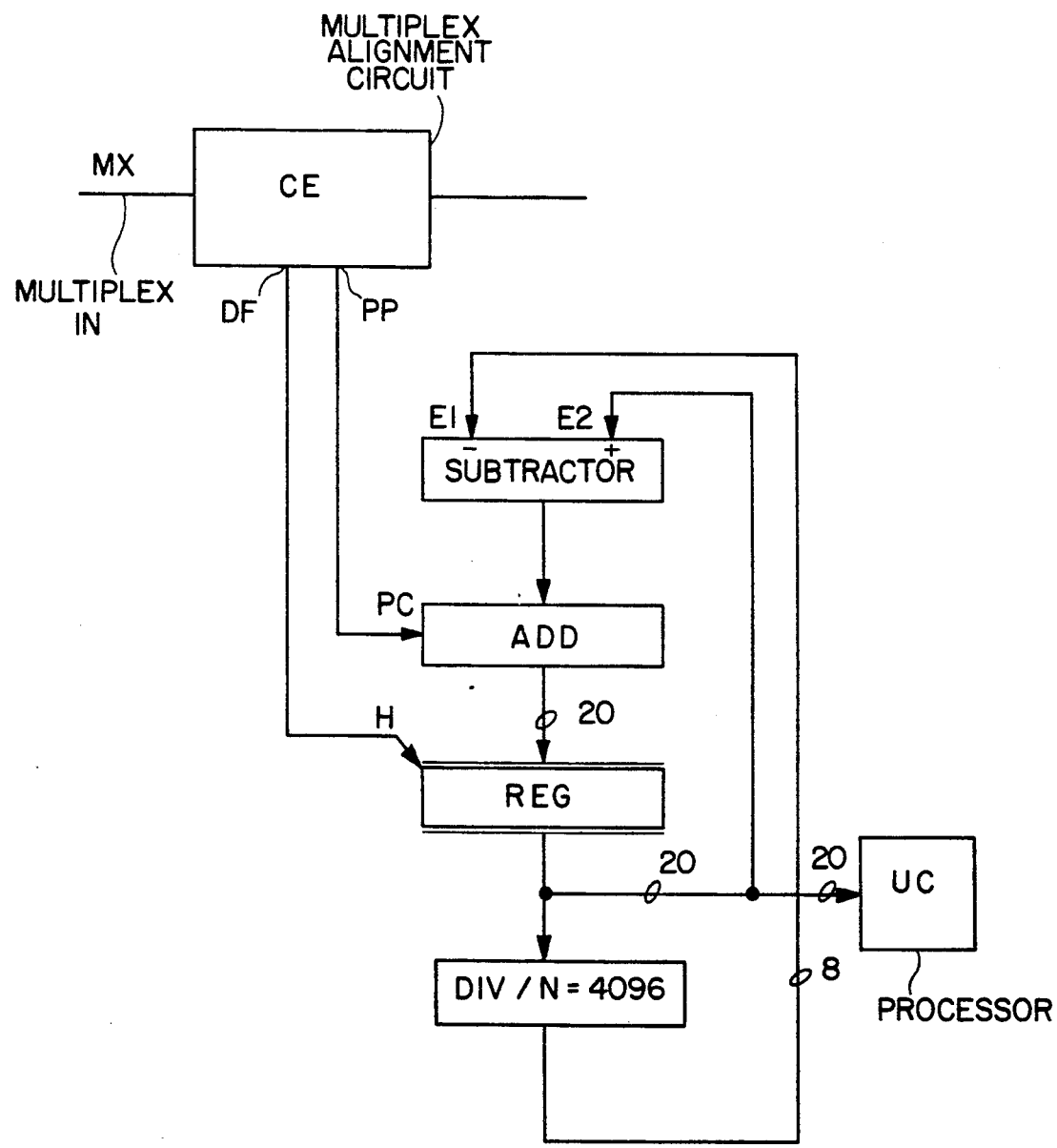

METHOD FOR MEASURING THE LOAD OF A MULTIPLEX AND CIRCUIT FOR ITS IMPLEMENTATION

The present invention relates to a method of measuring the load of a multiplex in and more particularly to a switching network for asynchronous cells or packets and a circuit for implementing the method of the invention.

The forwarding of any outputs and the division of the same resources of transmission constitute the main interest of the asynchronous time switching. In fact, the time multiplexing permits transmission on the same support, that is to say, the asynchronous time multiplex, cells or packets belonging to different virtual circuits. However, the allocation of the resources depends generally on statistics relating to the rates of activity of different transmitting sources although there is a risk of losses of information by an over-flowing of the waiting files due to instantaneous overloads. These losses must of course be minimized. One method described in the document FR-A-2616024 consists in measuring the output in packets of each communication. When the output packets are greater than a maximum threshold output, a signalling occurs which causes the elimination of the packets belonging to the communication in there which are too many packets as compared with this maximum threshold output. This packet elimination occurs before they are taken in charge by the switch member.

Other methods of traffic control are also known, such as those described in the article entitled "The Challenge of Multipoint Communication" by Jonathan S. Turner, 5th. ITC Seminar, Lake Como, May 1987, Chapter 5—Congestion Control. This document defines, in particular, the device known under the English name "leaky bucket".

Furthermore, French Patent Application No. 8902073 filed on the Feb. 17, 1989 and under the title "Method of reservation of outputs and time switches of asynchronous packets" accepts a new communication only if it does not involve the exceeding of a maximum output capable of flowing through the switches of the network. In other words, the method verifies that means are available before reserving it with a certainty for transmitting packets or cells to the reserved output. This phase of activation of the means can only follow a first phase of establishing the communication. In the course of this first phase, it is advisable to examine whether the activity of the current communications can take into account a new communication. The implementing of this procedure necessitates knowing at each moment the outputs or loads of the multiplexes of the network. It is, therefore, necessary to equip each multiplex of the system with a load measuring device.

One object of the invention consists in providing an extremely simply and rapid method of measuring the load of a multiplex.

Another object of the invention consists in providing a simple circuit intended to implement the method of the invention.

According to one characteristic of the invention, there is a load measuring method of an asynchronous multiplex in which at each cell transmitted on the multiplex a value is recorded which is divided by a predetermined number. The value forms the first operand of a subtraction and the result of the division forms the second operand of the subtraction. To the result of the subtraction a predetermined fixed value is added when the transmitted cell contains in its heading a particular identifier and a zero value in the contrary case. The result of the subtraction followed by the addition constitutes the new value to be recorded, which likewise represents the load measurement.

According to another characteristic the identifier identifies an occupied cell.

According to another characteristic the predetermined number is smaller than the maximum recordable value and the predetermined fixed value is below the predetermined number.

According to another characteristic the recorded value is a binary value comprising p bits and the predetermined number is a binary number comprising n bits with n less than p, the predetermined fixed value being equal to $2^{(p-n)}$.

According to another characteristic, a circuit implementing the method of the invention comprises a subtracter, an adder, a register and a divider. The clock input of the register receives the cell clock signal of the multiplex. The input signal of the register is applied to the output of the adder and the output signal of the register is applied in parallel to the first operand input of the subtracter, to the input of the divider and to the output of the circuit. The output of the divider is applied to the second operand input of the subtracter. The output of the subtracter is applied to the first input of the adder the second input of which receives a representative signal of the predetermined fixed value when the current cell of the multiplex contains in its heading the particular identifier and a zero value in the other cases. The adder output is applied to the input of the register.

The abovementioned characteristics of the invention as well as others will appear more clearly on reading one embodiment, the said description being made in relation to the attached drawing of the single FIGURE, which shows a load measuring circuit according to the invention.

In the single FIGURE, the measurement circuit according to the invention comprises a subtracter, an adder ADD, a register REG and a divider-by-N DIV. this circuit measures the load of the multiplex MX on a multiplex of cells alignment circuit CE. Such an alignment circuit is described in the document EP-A-113307. It will be remembered that this alignment circuit supplies a signal DF of level "1" every time it detects a cell output octet and a signal PP of level "1" every time the cell is not unoccupied.

Referring again to the measuring circuit, the clock input H of the register is connected to the output DF of the alignment circuit CE. The parallel signal input of the register REG is connected to the output of the adder ADD and its parallel signal output is connected to the signal input of the divider-by-N DIV. In the example described, the register RFG is a register with p bits and p has been selected equal to 20.

The output of the divider DIV is connected to the measurement output of the measurement circuit. The divider DIV divides the value of the contents of the register REG by N where N, in the example described, is selected equal to $2^n$. Thus, the divider DIV is a simple straight logical shifter of n bits. More precisely, in the example described, N=4096 which corresponds to n=12. It is apparent that p is substantially greater than n. The reason will be described subsequently.

The subtracter effects the subtraction of two operands:E2 less E1. It comprises a first input to which is applied the operand E2 and which is connected to the parallel signal output of the register REG. A second input of the subtracter receives the operand E1 and which is connected to the (p−n), that is, eight wires of lightest weight of the output signal of the divider DIV. The output of the subtracter is connected to the first input of the adder ADD. The second input of the adder is connected to the output PP of the alignment circuit CE. Thus, when the output PP is at "1", it is added to the result of the subtraction the number X which is equal here to $2^{(n-p)}$, that is, $2^8$ in the example described. When the output PP is at "0", the number "0". The output of the adder ADD is connected to the signal input of the register REG.

The single FIGURE shows the output of the register REG connected to the input of a processor UC which samples the values supplied by the measuring circuit of the invention.

In the course of the operation, at each clock pulse H. the contents of the register REG is transmitted to the divider DIV and at the input E2. The division is made, then the subtraction and the addition, then the result of the addition is recorded in the register REG which retains it until the next clock pulse. After a certain number of pulses H, it is found that the value of the contents of the register REG tends towards a value which corresponds to the load of the multiplex. The value is of this load brought to a maximum value equal to "1" and is given in binary form, by the whole part "0" followed by twenty bits of the register REG, these bits corresponding to the decimal part of the load.

By increasing the number p, that is to say, the number of bits of the register REG, a greater precision is obtained.

An increase in the number N(or $2^n$) causes a high duration of integration which permits or tends towards an average rate of load. On the other hand, by reducing the number N, one has a lesser duration of integration which corresponds to the measurement of a peak load. The fact that the number p is relatively large compared with the number n permits the desired rapidity of convergence by modifying in a simple manner the shift control of the divider DIV.

With p=20 and n=12, in the example described, one tends towards a duration of integration in the order of 4000 cells.

If the processor UC effects a sampling with a period in the order of a second, the frequency of knowledge of the load of the multiplex facilitates the admission of a new call and the operations of management and maintenance.

In the adder ADD, the embodiment which has just been described has taken into account all of the useful cells of the multiplex, independently of their relationships to any virtual circuit. However, in certain examples, one can proceed to a classifying of the cells on which the load measurement has to be effected. Thus, one can, at the input for the adder ADD, subject the authorization control of taking into account certain cells, to a special criterion. For example, this criterion may be supplied by a memory (not shown) for analysis of the VCI (Virtual Channel Identifier which is translated by Identificateur de Circuit Virtuel) the analysis memory existing in each switch and the criterion corresponding, for example, to the identifier contained in the heading of the cell.

We claim:

1. Method of measuring the load of a multiplex in particular in switching network of asynchronous cells or packets, at least some of said cells having an identifier in its heading, said method comprising the steps of recording a value responsive to each cell transmitted on the multiplex, dividing said recorded value by a predetermined number (N), said value forming a first operand (E2) of a subtraction and the result of the division forming a second operand (E1) of the said subtraction, adding a predetermined fixed value to the result of said subtraction when said transmitted cell contains a particular identifier in its heading, and a zero value in another case, and recording a new value responsive to the result of the subtraction followed by the addition constituting said new value which represents a measurement of the load.

2. A method according to claim 1, in that said identifier identifies an occupied cell.

3. A method according to claim 1 or 2, characterized in that said predetermined number (N) is smaller than a recordable maximum value ($2^p$) and said fixed predetermined value is less than the said predetermined number (N).

4. A method according to one of the claims 1 or 2, characterized in that a recordable value is a binary number comprising n, number of bits with n being less than p number of bits, the predetermined fixed value being equal to $2^{(p-n)}$.

5. A circuit for implementing the method according to one of the claims 1 or 2, characterized in that it comprises a subtracter and an adder, a register and a divider, a clock input on the register for receiving a cell clock signal of the multiplex, a signal input of the register being connected to an output of the adder; and a signal output of the register being connected in parallel, to a first operand input of the subtracter, to the input of the divider and to the output of said circuit; the output of the divider being connected to a second operand input of the subtracter; an output of the subtracter being connected to a first input of the adder a second input of said adder being connected to receive a representative signal of the predetermined fixed value when the current cell of the multiplex contains, in its heading, the particular identifier and a value zero in the other cases, an outlet of the adder being connected to an input of the register.

6. A circuit according to claim 5, characterized in that the representative signal of the predetermined fixed value is a signal indicating that the cell is occupied.

7. A circuit according to claim 6, characterized in that the clock input of the register is connected to a clock output cell of an alignment circuit mounted in series on the multiplex, the second input of the adder being connected to a presence of an occupied cell output of the said alignment circuit.

8. A circuit according to claim 5 characterized in that the output of the register is connected to an input of a processor for taking the periodical sampling of the value of the load measurement.

* * * * *